Dec. 16, 1969　　　　J. MEIER　　　　3,483,935
PRECISION BALANCE
Filed Nov. 6, 1967
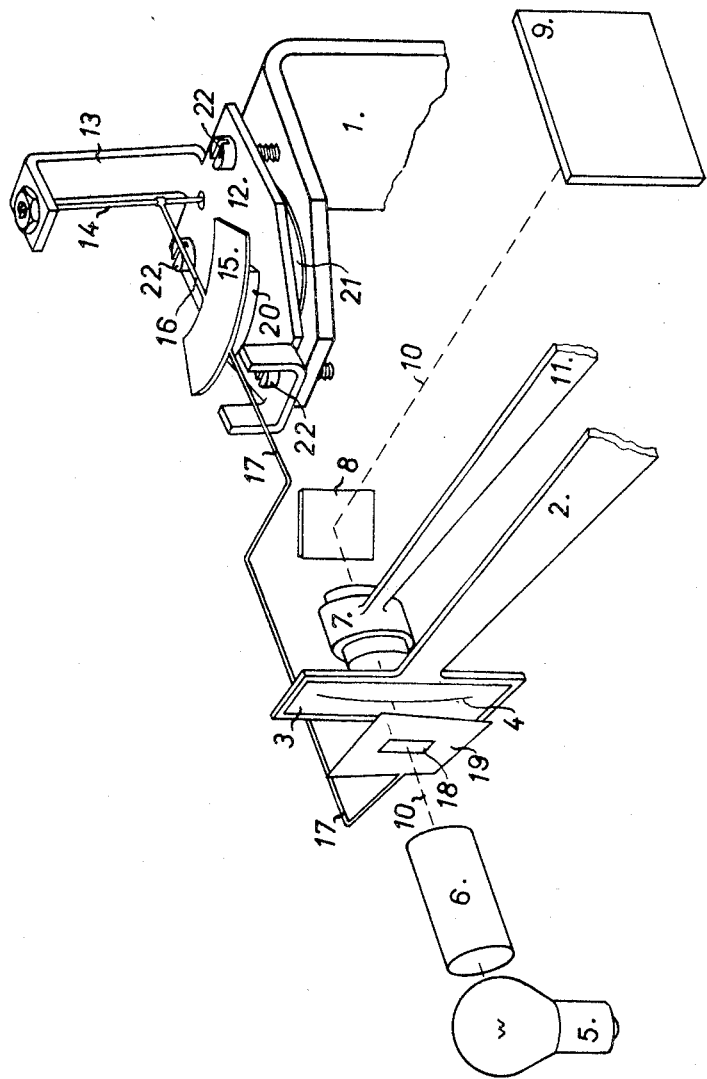
INVENTOR:
Johann Meier
BY:
Lawrence B. Laufsche
ATTORNEY United States Patent Office 3,483,935
Patented Dec. 16, 1969

3,483,935
PRECISION BALANCE
Johann Meier, Stafa, Switzerland, assignor to Mettler Instrumente A.G., Zurich, Switzerland, a corporation of Switzerland
Filed Nov. 6, 1967, Ser. No. 680,719
Claims priority, application Switzerland, Mar. 8, 1967, 3,383/67
Int. Cl. G01g 23/32
U.S. Cl. 177—178                 9 Claims

ABSTRACT OF THE DISCLOSURE

Precision balance of the type comprising a scale plate attached to one arm of a pivotally mounted balance beam and an optical system adapted to project an image of said scale plate onto a screen. A mechanical inclination indicator is provided the movable indicating member of which having a vane which projects into the optical axis of said optical system in such a way that, if the frame of the balance is inadequately levelled, the image of the said scale plate visible on the screen is different from that present in the case of adequate levelling.

---

Precision balances usually have an asymmetric beam pivotally mounted on the balance frame. As a means for reading the weight decimals resulting from the inclination of the beam a scale plate incribed with numbers and graduations is attached to the longer arm of the beam. A projecting device is also generally provided, its objective lens projecting whichever part of the scale is within the optical axis, optically enlarged, onto a screen mounted in the balance frame.

According to the nature of the table or bracket, on which the balance stands more or less pronounced errors occur in practical use in levelling the frame of the balance relatively to the horizontal, and these may often be unpredictably subject to fluctuations. Where such errors result in variations in the inclination of the balance frame longitudinally of the balance beam, the zero point will be displaced, thereby causing errors in reading the last decimals of weight.

precision balances of the above construction have been fitted with an additional device for automatically compensating for the displacements of the zero point caused by errors in levelling the balance frame. For this purpose a special pendulum is suspended in the balance frame, capable of moving independently of the beam and having its axis of pivoting co-axial with that of the beam. The objective of the optical projecting system is mounted on an arm projecting laterally from the pendulum and, if the whole arrangement is correctly dimensioned, the zero point visible on the screen will then remain constant even if the inclination of the balance frame fluctuates. However, even this device provides no guarantee of weights being determined correctly. Thus if the error in levelling the frame becomes too great then, although the zero point can be kept constant, the sensitivity of the beam will vary considerably. The dependency of sensitivity on error in levelling of the balance frame cannot be compensated for automatically by means of the additional pendulum as described above.

The levelling of the balance frame should therefore be checked before each reading, and a sufficiently sensitive spirit level is generally mounted on the balance frame for this purpose. Experience shows, however, that too little attention is paid to the spirit level, particularly in precision balances having the above mentioned device for automatically correcting the zero point. Readings are frequently taken although the admissible error in levelling the balance frame may already have been far exceeded.

The present invention accordingly concerns a precision balance comprising a beam fulcrumed on the balance frame and having a scale plate on one of its arms; an optical projecting system for producing a magnified image of that part of said scale plate which dips into the optical axis of this projecting system; a mechanical inclination indicator mounted on said balance frame and having a movable indicating member; and a vane fastened to said indicating member which dips into the optical axis of said projecting system in such a way that, if the balance frame is inadequately levelled, the image of said part of the scale plate is different from that present in the case of adequate levelling. The difference may be that with inadequate levelling said image appears in a striking colour whereas with adequate levelling it is white. A still better arrangement is for the image to be much darkened or even completely extinguished in the case of inadequate levelling, so that a comfortable reading of a bright image can only be taken if the balance frame is sufficiently levelled.

Other objects and advantages of the invention will become apparent from the study of the following specification when considered in connection with the accompanying drawing, in which the single figure is a perspective view of the essential parts of a precision balance according to the present invention and in which any details not directly essential to an understanding of the invention have been omitted.

Only part of the balance frame is illustrated, namely its upwardly projecting arm 1, on the angled end portion of which an inclination indicator of basically known construction is fixed. Of the beam only the longer arm 2 is indicated in the drawing, the scale plate 3 being attached to the end of this arm. Along the arcuate portion 4 the scale plate carries the usual graduations with the appropriate digits. The optical projecting read-out system, as usual comprises the lamp 5, the illuminating condenser means 6, the objective 7, a deflecting mirror 8 and the screen 9. The entire optical projecting system with the possible exception of the objective 7 is attached to the balance frame (not shown in detail). The optical axis of this projecting system is marked in dotted lines in the drawing and shown at 10.

If the precision balance has no automatic means for adjusting the zero point, the objective 7 will also be attached to a part of the balance frame; whereas if the precision balance is fitted with such means the objective 7 will be fixed to the laterally extending arm 11 of an additional pendulum. The axis of rotation of such a pendulum will then be parallel with the centre knife edge of the balance beam, and the pendulum is suspended from the balance frame so that it can adjust itself relatively to the horizontal according to the inclination of the balance frame and independently of the beam. The drawing shows only the laterally projecting arm 11 of the pendulum, which normally extends parallel with the direction of the adjacent arm 2 of the balance beam.

The mechanical inclination indicator attached to the angled end portion of the arm 1 of the balance frame is so constructed and arranged that it chiefly checks the levelling of the balance frame in the direction parallel with the arm 2 of the beam when the latter adopts the central position indicated in the drawings. Among the mechanical indicators known per se the construction illustrated in the drawing has been found particularly advantageous for the present purposes. In this construction the stationary part of the indicator has a base plate 12 provided with an upwardly extending yoke 13. The movable indicating member is rotatably mounted between two bearings arranged one above the other in the base plate 12 and in the top of the yoke 13, conical bearings preferably being used. The indicating member is basically a pendulum in which the spindle 14 extends not quite vertically and in which the weight 15 is offset substantially laterally from the spindle 14. The pendulum weight 15 is formed by a sectorial copper plate rigidly fixed to the spindle 14 by a strut 16. In the place of the otherwise customary pointer for indicating the inclination the movable indicating member has an arm 17 with multiple bends, having a masking vane 19 containing an aperture 18 fixed to its end. The arrangement is such that the vane 19 engages in the optional axis 10 of the projecting system. In order to suppress the pendulum oscillations of the movable indicating member a permanent magnet 20 is fixed to the base plate 12 to form an electromagnet eddy current brake together with the sectorial copper plate 15.

The mechanical inclination indicator described is attached in an easily adjustable manner to the angled end portion of the arm 1 of the balance frame. For this purpose the base plate 12 of the indicator is held to the said end portion of the arm 1 by means of three screws 22 with a resilient washer 21 interposed. By appropriately turning the screws 22 while the balance frame is exactly levelled the inclination indicator can be adjusted in such a way, firstly that its spindle 14 is inclined to the vertical by a small angle of e.g. 1.5 degrees and, secondly, that this inclination takes place in a vertical plane at least approximately parallel to the direction of the knife edges of the balance beam. The optical axis 10 of the projecting system then has to pass through the centre of the aperture 18 in the vane 19.

If the balance frame is inclined somewhat longitudinally of the beam and out of its horizontal position, the pendulum of the inclination indicator will swing correspondingly, possibly until the optical axis 10 can no longer pass through the aperture 18 and then meets the vane 19. In this way the image visible on the screen 9 is initially darkened but is completely extinguished if the inclination indicator swings further over. This is assuming that the vane 19 is non translucent. If on the other hand, a translucent but coloured vane 19 is used, then as the balance frame is progressively inclined the image visible on the screen 9 will change its colour, the change of colour being accompanied by a certain diminution in the brightness of the image. The sensitivity of the inclination indicator may easily be adjusted so that the nomral bright image of the appropriate part of the scale 3 appears on the screen 9 only within the range of admissible errors in levelling the balance frame, whereas when inadequate levelling has taken place the said image is changed as explained above, thereby immediately drawing attention to the inadequacy of the levelling. With the balance described one has therefore only to observe the screen 9 in order to find out at any time whether the balance frame is still sufficiently accurately levelled. The observer's attention is thus directed to any errors in levelling before he takes any reading of the weight decimals appearing on the screen 9.

While in accordance with the provision of the Patent Statutes, the preferred form and embodiments of the invention have been illustrated and described, it will be apparent to those skilled in the art that modifications may be made without deviating from the invention.

What is claimed is:

1. A precision balance, comprising
a frame;
balance beam means including a balance beam pivotally connected with said frame for pivotal movement about a horizontal pivot axis, and a scale plate carried by said balance beam;
optical read-out means connected with said frame for establishing a fixed optical axis arranged to be traversed by said scale plate during movement of said balance beam, said optical read-out means including a light source, a screen, and means including an objective lens for projecting on said screen a magnified image of that part of the sacle plate which traverses said fixed optical axis;
and mechanical inclination indicator means responsive to the leveling of the frame in the direction parallel with the beam for varying the magnified image of said plate, comprising an indicating member connected with said frame for pivotal movement about a generally vertical axis contained in a vertical plane parallel with the balance beam pivot axis, and vane means carried by said indicating member for traversing said optical axis to vary said magnified image.

2. Apparatus as defined in claim 1, wherein the pivot axis of said indicating member is slightly inclined to the vertical, and further including pendulum arm means pivotally connected with said frame for pivotal movement about an axis parallel with the balance beam pivot axis, said objective lens being carried by said pendulum arm means for automatic adjustment of said optical system relative to the horizontal independently of said balance beam and said mechanical inclination indicator means.

3. Apparatus as defined in claim 2, wherein said vane means contains an aperture which is aligned with said optical axis when the frame is properly leveled to permit an unhindered projection of said part of the scale plate.

4. Apparatus as defined in claim 2, wherein said vane means comprises a colored filter that is inserted in said optical axis to vary the magnified image when the frame is improperly leveled.

5. Apparatus as defined in claim 2, wherein said vane means contains an opaque section that is inserted in said optical axis to vary the magnified image when the frame is improperly leveled.

6. Apparatus as defined in claim 2, wherein said inclination indicator means includes a base plate, and means mounting said base plate on said frame, comprising a resilient washer arranged between said base plate and said frame, and a plurality of leveling screws connected with said base plate for leveling said base plate relative to said frame.

7. Apparatus as defined in claim 2, and further wherein said inclination indicator means comprises a sectorial shaped plate secured to said inclination member, and permanent magnet meas cooperatig with said weight to define an eddy current brake for suppressing pendulum oscillations of said inclination indicator member.

8. A precision balance, comprising
a frame;
balance beam means including a balance beam pivotally connected with said frame for pivotal movement about a horizontal pivot axis, and a scale plate carried by said balance beam;
optical read-out means connected with said frame for establishing a fixed optical axis arranged to be traversed by said scale plate during movement of said balance beam, said optical readout means including a light source, a screen, and means including an objective lens for projecting on said screen a magnified image of that part of the scale plate which traverses said fixed optical axis;
and mechanical inclination indicator means for varying the magnified image of the scale plate only when an admissible error in leveling of the balance frame is exceeded, said mechanical inclination indicator means including an indicating member having a spindle portion connected with said frame for rotation about a generally vertical axis, and a weight portion offset substantially laterally from said spindle portion.

9. A precision balance, comprising
a frame;
balance beam means including a balance beam pivotally connected with said frame for pivotal movement about a horizontal pivot axis, and a scale plate carried by said balance beam;

optical read-out means connected with said frame for establishing a fixed optical axis arranged to be traversed by said scale plate during movement of said balance beam, said optical read-out means including a light source, a screen, and means including an objective lens for projecting on said screen a magnified image of that part of the scale plate which traverses said fixed optical axis;

pendulum arm means pivotally connected with said frame for pivotal movement about an axis parallel with the balance beam pivot axis, said objective lens being carried by said pendulum arm means for automatic adjustment of said optical system relative to the horizontal independently of said balance beam;

and mechanical inclination indicator means operable independently of said pendulum arm means for varying the magnified image of the scale plate only when an admissible error in leveling of the balance frame is exceeded, said mechanical inclination indicator means including an indicating member having a spindle portion connected with said frame for rotation about a generally vertical axis, and a weight portion offset substantially laterally from said spindle portion.

References Cited

UNITED STATES PATENTS

| | | | |
|---|---|---|---|
| 3,114,284 | 12/1963 | Vargady. | |
| 3,150,730 | 9/1964 | Baur | 178—178 |
| 3,193,030 | 7/1965 | Meier | 178—164 |
| 3,207,243 | 9/1965 | Baur | 178—178 |

FOREIGN PATENTS

| | | |
|---|---|---|
| 234,395 | 6/1964 | Austria. |

RICHARD B. WILKINSON, Primary Examiner

GEORGE H. MILLER, JR., Assistant Examiner